UNITED STATES PATENT OFFICE.

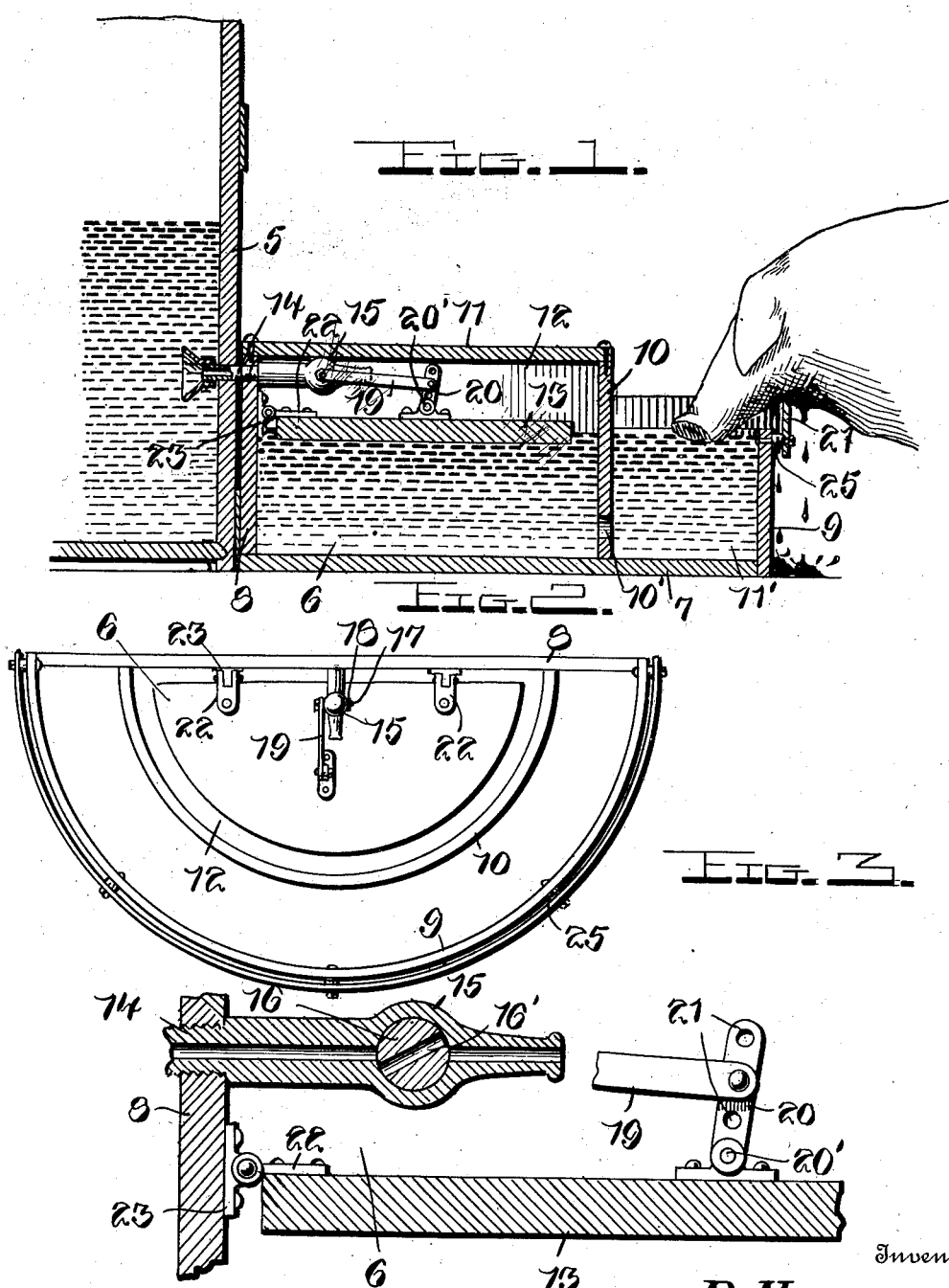

BERNARD HASMAN, JR., OF LINDSAY, NEBRASKA.

WATERING-TROUGH.

976,874.

Specification of Letters Patent.

Patented Nov. 29, 1910.

Application filed August 17, 1910. Serial No. 577,720.

*To all whom it may concern:*

Be it known that I, BERNARD HASMAN, Jr., a citizen of the United States, residing at Lindsay, in the county of Platte and State of Nebraska, have invented certain new and useful Improvements in Watering-Troughs, of which the following is a specification, reference being had to the accompanying drawings.

This invention relates to an improved watering trough for live stock and more particularly to a trough of this character for containing drinking water for hogs.

My invention has for its principal object the provision of a trough of simple and durable construction having a scraping blade attached thereto to scrape the mud from the snout and neck of the animal as the head is extended into the trough thus preventing the water from becoming dirty.

A further object of the invention is to provide means for automatically replenishing the trough and to cut off the water supply thereto thereby obviating its overflow.

With these and other objects in view, the invention consists of the novel features of construction, combination and arrangement of parts hereinafter fully described and claimed, and illustrated in the accompanying drawings, in which—

Figure 1 is a vertical section of a watering trough constructed in accordance with my invention; Fig. 2 is a top plan view; and Fig. 3 is an enlarged detail section of the valve and float.

Referring more particularly to the drawing 5 indicates a water supply tank or vessel, and 6 my improved watering trough which is arranged exteriorly at the base and closely adjacent to said tank.

As illustrated in Fig. 2, in the preferred embodiment of the invention, the trough is substantially semi-circular in plan and comprises a base 7 and a rear wall 8 rising from said base and disposed parallel to and against one side of the supply vessel 5. The front wall 9 of the trough is secured to the semi-circular front edge of the base 7 and is of less height than the rear wall 8. A second semi-circular wall 10 is arranged in concentric relation to the front wall 9 between the same and the rear wall 10. A top or cover plate 11 is removably arranged upon the upper edges of the walls 8 and 10. A water space 11' is thus provided between the plates 9 and 10 into which water flows through a plurality of openings 10' in the wall 10 from the float chamber 12. In this float chamber the semi-circular float 13 is arranged, the edges of which are parallel to the walls 8 and 10. A water supply pipe 14 extends through the wall of the tank or vessel 5 and the rear wall 8 of the trough. The outer end of this supply pipe has a casing 15 formed thereon in which the rotary valve member 16 is disposed. This valve member is provided with a port 16' which is adapted to aline with the bore of the pipe 14 upon opposite sides of the valve casing to permit the flow of water from the supply tank through the valve and into the float chamber. The rotary valve member 16 is of the usual conical form and has threaded in its smaller end which extends through one side of the casing 15, a screw 17 the head of which engages a washer 18 which is of greater diameter than the end of the valve member 16 and is engaged upon the same. To the other end of the valve member one end of an arm 19 is rigidly secured, the other end of said arm being adjustably connected to a link 20 which is pivoted at one end to the float 13, as indicated at 20'. This link is provided with a plurality of openings 21 and a pin is adapted to be inserted through any one of said openings and a registering opening in the end of the arm 19. Thus the arm and link may be easily and quickly disconnected to adjust said arm on the link. The float 13 has secured thereto adjacent to each of its ends a hinge plate 22 which is hinged upon a pintle mounted in bearings 23 secured to the rear wall of the trough.

From the above description taken in connection with the accompanying drawing, it will be seen that as the height of the water in the trough gradually diminishes, the float 13 will lower in the chamber 21 and through the medium of the arm 19, the valve member 16 will be rotated until its port 16' is alined with the bore of the supply pipe 14. The water in the trough is thus automatically replenished so that the same never becomes entirely emptied. The reverse action takes place as the water rises in the trough, the float 13 moving upwardly in the chamber 12 to turn the valve member 16 and angularly position its port with relation to the bore of the supply pipe, thus cutting off the flow of water into the trough.

To the upper edge of the semi-circular front wall 9 of the trough, a scraping plate 24 is secured by means of suitable bolts or other analogous fastening devices 25. As shown in Fig. 1 of the drawings this scraping blade or plate is adapted to engage the under side of the hog's snout or neck and remove the dirt, mud and other filth therefrom so that the same will not be deposited in the water as the animal extends its head over the upper edge of the wall 9. The water is thus always kept perfectly clean thereby rendering the trough sanitary.

From the foregoing it is believed that the construction and operation of my improved watering trough will be readily understood. The device is extremely simple and strong and durable in construction. While it is more particularly adapted for watering hogs and similar live stock, it may be also utilized for the watering of fowls, and while I have above described the several specific features embodied in its construction, it will be understood that the device is susceptible of a great many minor modifications without departing from the essential feature or sacrificing any of the advantages of the invention.

Having thus described the invention what is claimed is:—

1. A watering trough of the character described comprising a base, a rear wall rising from the base, parallel spaced walls arranged on said base and engaging at their ends with the rear wall, said parallel walls providing a water space between them, one of said walls having a plurality of water outlet openings therein, a removable plate arranged upon the latter wall and the rear wall to form a chamber, in combination with a water supply pipe extending into said chamber having a valve therein, and a float in said chamber connected to said valve to actuate the same and control the water supply.

2. A trough of the character described comprising a base, front and rear walls rising therefrom, an intermediate wall arranged on the base in parallel relation to the front wall, said wall having a plurality of openings therein, a removable cover plate on the intermediate and rear walls to provide a chamber between them, a scraping plate secured to the upper edge of the front wall, in combination with a water supply pipe extending through the rear wall from a suitable source of water supply and having a valve in its end, and a float in said chamber hinged to the rear wall and connected to said valve to actuate the same and control the water supply.

3. The combination with a supply pipe, of a trough arranged closely adjacent thereto and comprising front and rear walls, said front wall being of less height than the rear wall, an intermediate wall arranged nearest to the front wall and of the same height as the rear wall, said intermediate wall having a plurality of openings therein, a cover plate removably arranged upon the intermediate and rear walls to form a chamber between them, a scraping blade secured to the upper edge of the front wall throughout its length, a water supply pipe extending through the rear wall and through the wall of the supply tank, and means for automatically controlling the supply of water from said tank to the chamber.

In testimony whereof I hereunto affix my signature in the presence of two witnesses.

BEN HASMAN, Jr.

Witnesses:
 WM. HASMAN,
 ED. STIBLEY.